United States Patent [19]

Gibbons et al.

[11] Patent Number: 5,530,704
[45] Date of Patent: Jun. 25, 1996

[54] METHOD AND APPARATUS FOR SYNCHRONIZING RADIO PORTS IN A COMMNUICATION SYSTEM

[75] Inventors: David B. Gibbons, Arlington; Robert L. Maxwell, Keller; David P. Kilp, Colleyville, all of Tex.

[73] Assignee: Motorola, Inc., Schaumburg, Ill.

[21] Appl. No.: 390,206

[22] Filed: Feb. 16, 1995

[51] Int. Cl.⁶ ..................................................... H04L 7/00
[52] U.S. Cl. .................. 370/94.2; 370/105.1; 370/105.4; 370/106; 370/108; 375/356; 379/58; 340/825.2; 455/51.1
[58] Field of Search ................................ 370/94.2, 100.1, 370/101, 105.1, 105, 4, 106, 108, 110.1, 95.3; 375/356; 455/33.1, 33.2, 51.1; 379/58–60, 63; 340/825.2, 825.21

[56] References Cited

U.S. PATENT DOCUMENTS 4,729,123  3/1988  Wheen ................................. 370/100.1
5,072,449  12/1991  Enns et al. ......................... 370/94.2 X
5,124,698  6/1992  Mustonen ....................... 340/825.21 X
5,245,634  9/1993  Averbuch ........................... 375/356 X
5,321,737  6/1994  Patsiokas ................................ 379/58
5,335,360  8/1994  Marko et al. ......................... 455/56.1
5,363,375  11/1994  Chuang et al. ....................... 370/95.3
5,388,102  2/1995  Griffith et al. ...................... 370/105.1

Primary Examiner—Douglas W. Olms
Assistant Examiner—Russell W. Blum
Attorney, Agent, or Firm—John G. Rauch; Barbara R. Doutre

[57] ABSTRACT

A communication system (100) provides simultaneous synchronization between a network controller (106) and numerous radio ports (102) using a single signaling channel. The network controller (106) includes a multiframe synchronization generator (208) which generates a multiframe synchronization packet (302) in response to a series of counters (212) and a timing reference (202). Each radio port (102) includes a multiframe synchronization detector (410) which verifies that the multiframe synchronization packet (302) is error free.

19 Claims, 6 Drawing Sheets

METHOD AND APPARATUS FOR SYNCHRONIZING RADIO PORTS IN A COMMNUICATION SYSTEM

TECHNICAL FIELD

This invention relates in general to communication systems and more specifically to radio telephone communication systems.

BACKGROUND OF THE INVENTION

Personal communication systems (PCS) operate using various protocols and standards specifications that have been bought or licensed for various customer/geographic locations. Digital European Cordless Telephone (DECT) and Wireless Customer Premise Equipment (WCPE) are examples of PCS protocols. The DECT specification is a communication protocol defined by the European Telecommunications Standards Institute (ETSI). The DECT specification uses Time Division Multiple Access (TDMA) and Time Division Duplexing (TDD) to allow multiple Radio Frequency communications links from one dedicated radio frequency (RF) transceiver. Communication systems, such as DECT and WCPE, use signaling channels, such as B and D Channels, to support the communication linking process. Each of the separate links includes B and D Channel data. The DECT radio ports (or base stations) interface to a central controller via a digital network interface that also supports B and D Channel data. The digital network interface also supports a C-Channel which is a separate channel of signaling bits used for embedded operations. This channel is available in Primary and Basic Rate interfaces.

WCPE systems are governed by the Federal Communications Commission (FCC) rules for unlicensed personal communication service (FCC Part 15, Subpart D). In both DECT and WCPE systems, remote radio ports must be in multiframe, frame, slot, and bit alignment with one another. This alignment requirement results in the system controller transmitting a multiframe number and a synchronization pulse to each radio port simultaneously. Achieving this simultaneous transmission using a software approach is difficult because it requires synchronizing a software message to a hardware event. This would involve message priority schemes and detailed timing analysis of software operating system latencies. The issue is further complicated by the fact that the message must be broadcast to all remote radio ports in the system.

Hence, there is a need for an apparatus and technique which performs multiframe synchronization of all radio ports within a PCS system preferably without any additional software overhead.

DETAILED DESCRIPTION OF THE PREFERRED EMBODIMENT

Figure 1:
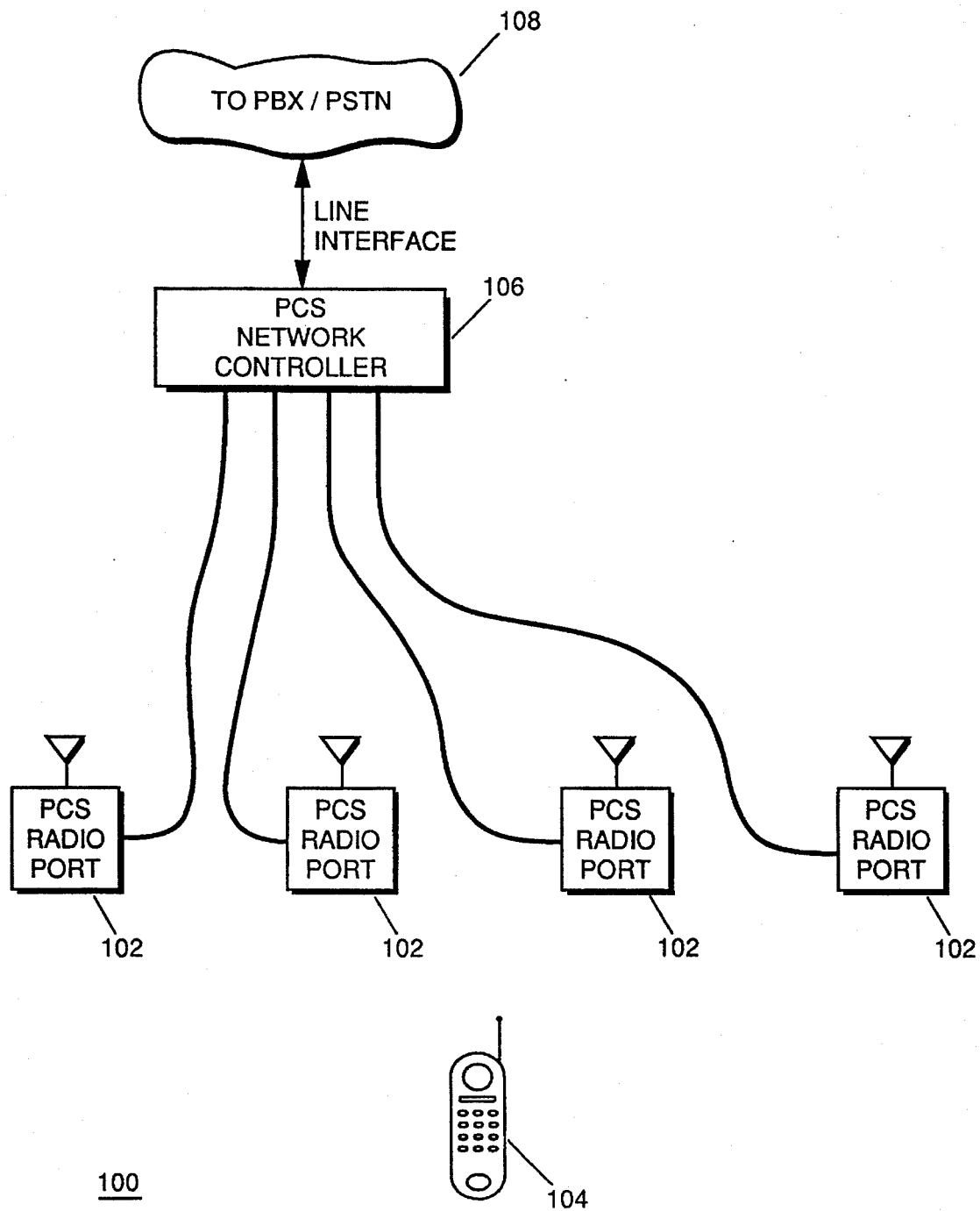
FIG. 1 is a block diagram of a communication system in accordance with the present invention.

Referring now to FIG. 1, there is shown a communication system 100 in accordance with the present invention. The communication system 100, comprises a plurality of radio ports 102, also known as base stations, and at least one portable communication unit 104 preferably a subscriber telephone handset. Each radio port 102 is connected to a common PCS network controller 106, also known as a system controller, which provides network interface control information for call processing, call hand-off, and authentication. The radio ports 102 enable a subscriber to acquire access to any of the information and services available through the PCS network controller 106. The PCS network controller 106 is also connected to a public switched telephone network (PBX/PSTN) 108 to allow subscribers to communicate with wired telephone users.

Synchronization between radio ports 102 is required in order to achieve successful hand-off between radio ports as the subscriber unit 104 moves within the communication system. In the two embodiments of the invention to be described herein, a single predetermined channel of a digital network interface, located within the PCS network controller 106, is used to broadcast a multiframe synchronization event, including a multiframe number and synchronization word, using a synchronous bit sequence without any additional software overhead.

Figure 2:
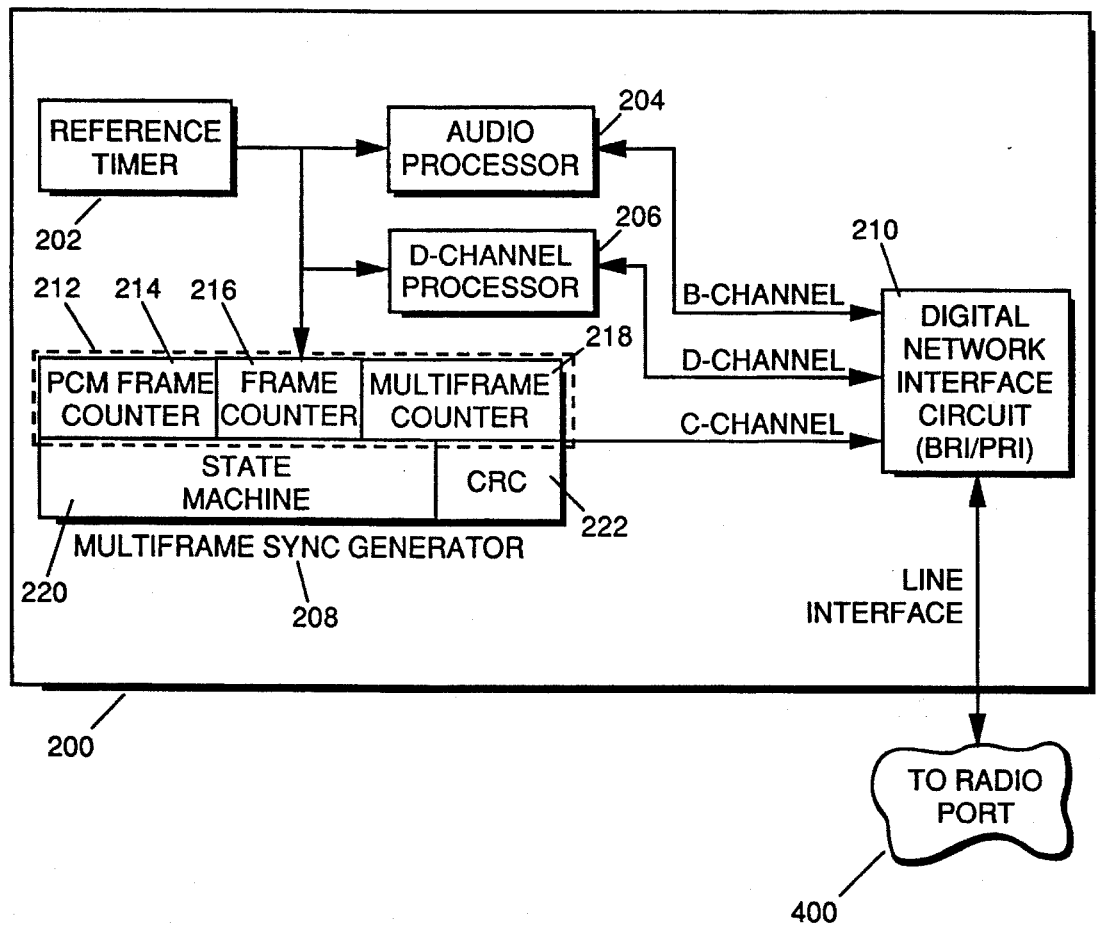
FIG. 2 is a detailed block diagram of a portion of a PCS network controller in accordance with the present invention.

Referring now to FIG. 2, there is shown a detailed block diagram of a PCS network controller 200, such as the PCS network controller 106 of FIG. 1, in accordance with the present invention. Included within the PCS network controller 200 are a reference timer 202 which sets a timing reference for an audio processing device 204, a D-channel processor 206, and multiframe synchronization (sync) generator 208. The audio processing device 204 provides digital-to-analog and analog-to-digital conversions. B-Channel digital data is received and transmitted by the audio processing device 204 via a digital network interface 210, such as a Basic Rate (BRI) or a Primary Rate (PRI) interface. The D-Channel processor 206 is used primarily for protocol messaging.

The multiframe sync generator 208, residing within the PCS network controller 200, is responsible for generating a multiframe synchronization event and for broadcasting this event to all of the radio ports, such as radio ports 102 of FIG. 1, within the communication system simultaneously. The multiframe sync generator 208 uses the time reference 202 output as a clock source for a chain of counters 212. These counters 212 generate a multiframe number appropriate for the communication protocol being used. Using the DECT protocol as an example, a time reference 202 might be based on the pulse code modulated (PCM) highway 4.096 megahertz (MHz) clock. This clock source can then be divided by 512 to produce 8 kilohertz (KHz) PCM frames. A PCM frame counter, such as a modulo 80 PCM counter, 214 then counts the number of PCM frames. When the PCM frame counter 214 reaches its predetermined count, a frame counter 216 is incremented. When the frame counter 216 reaches its terminal count, a multiframe counter, such as a 24 bit binary multiframe counter, 218 is incremented. Each time the multiframe counter 218 is incremented, a synchronizing event can be initiated.

A state machine 220, preferably located within the multiframe sync generator 208, monitors the multiframe counter 218. When the multiframe counter 218 is incremented, the state machine 220 transmits a synchronization word on the C-Channel of the digital network interface 210. A cyclic redundancy check (CRC) generator 222 performs a predetermined calculation on the multiframe number and generates a check byte which is then appended to the current multiframe number. The state machine then transmits the current multiframe number along with the corresponding check byte and synchronization word on the C-Channel of the digital network interface. A line interface then transfers the B-Channel, D-Channel and C-Channel data from the digital network interface 210 to the radio ports, such as the radio ports 102 of FIG. 1, within the communication system.

Figure 3:
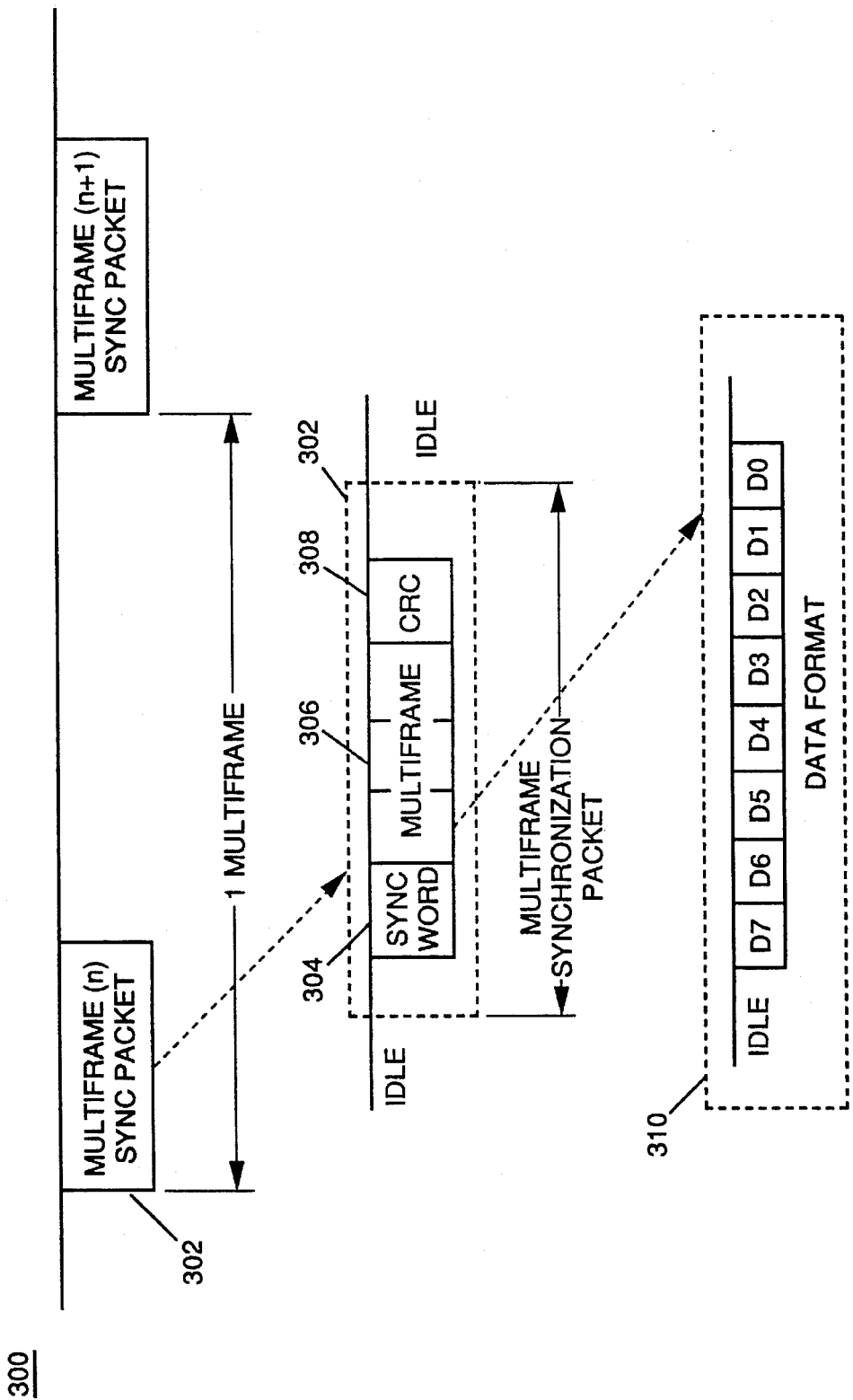
FIG. 3 is a multiframe synchronization packet timing diagram in accordance with the present invention.

Referring now to FIG. 3, there is shown a timing diagram of digital data signaling information 300 in accordance with the PCS network controller 200 of the present invention. The synchronization word 304, the multiframe number 306, and the check byte 308 constitute the Multiframe Synchronization Packet 302. In a DECT system, the Multiframe Synchronization Packet 302 is preferably transferred at every multiframe of 160 milliseconds (ms). Data format 310 represents a further breakdown of the multiframe synchronization packet 302. The synchronization packet 302 is preferably transferred over the C-channel of network controller 200 to the radio ports of the communication system, however, the B or D channels can be used as well. The predetermined check byte calculation can be modified from system to system. No software intervention is required at the system controller 200 to transmit this multiframe event.

Figure 4:
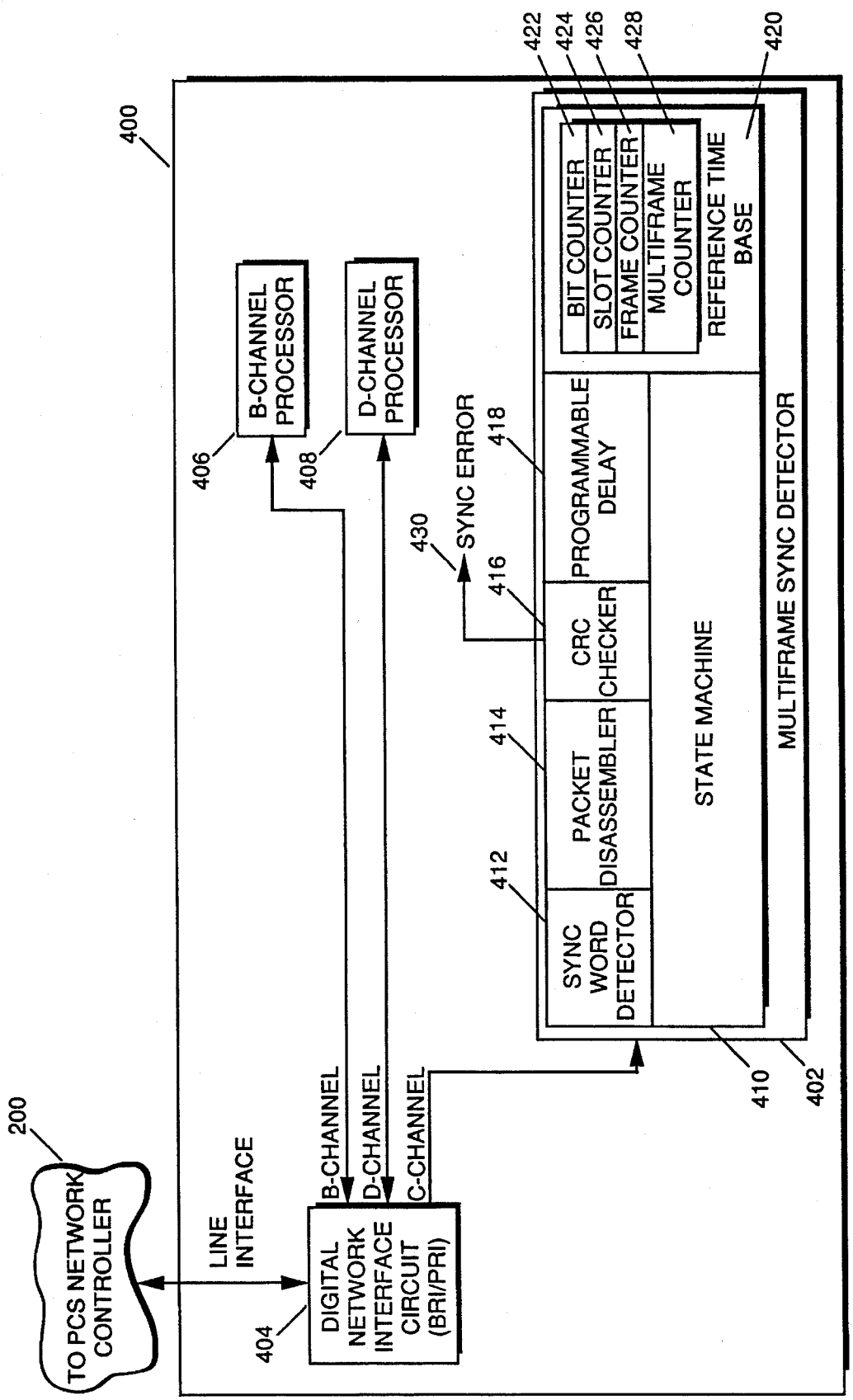
FIG. 4 is a detailed block diagram of a portion of a PCS radio port in accordance with the present invention.

Referring now to FIG. 4, there is shown a detailed block diagram of a portion of a radio port 400, such as the radio port 102 of FIG. 1, including a multiframe synchronization detector 402 in accordance with the present invention. Included with the radio port 400 is a digital network interface 404 for receiving B, D, and C-channel data from the PCS network controller 200. The B-Channel data is sent to the B-Channel processor 406 for buffering and formatting. The D-Channel data is sent to the D-Channel processor 408 for radio port control. The C-channel data is forwarded to the multiframe sync detector 402 in accordance with the present invention.

In the preferred embodiment of the invention, the multiframe sync detector 402 includes a sync word detector 4 12, a packet disassembler 414, a CRC checker 416, a programmable delay timer 418, a reference time base 420 and a state machine 410. The sync word detector 412 searches the incoming C-Channel data stream for the occurrence of a synchronization word. The packet disassembler 414 reformats the received C-Channel data into the various component elements (i.e., sync word, multiframe number, and check byte). The CRC checker 416 performs a CRC calculation on the received packet and determines whether the packet is valid. Various CRC calculations can be performed to determine the validity of the received packet. For example, the CRC calculation could compare the received check byte of the received packet to the expected check byte and report the result of the comparison as a new check byte which must remain within a predetermined threshold to be considered valid. The programmable delay timer 418 counts for a programmable time period and indicates when the period ends. The programmable delay is used to compensate for delay variations between radio ports due to line interface variations and wire propagation delays. The reference time base 420 is preferably composed of a series of counters that provide bit, slot, frame and multiframe timing for the particular communication protocol. Using the DECT protocol as an example once again, the reference time base 420 is preferably composed of a bit counter 422, such as a modulo 480 bit counter, a slot counter 424, such as a modulo 24 slot counter, a frame counter 426, such as a modulo 16 frame counter, and a multiframe counter 428, such as a 24 bit binary multiframe counter.

In the preferred embodiment of the invention, the sync word detector 412 of the multiframe sync detector 402 monitors the incoming C-Channel data stream. When the sync word detector 412 detects a synchronization word, the state machine 410 starts the programmable delay timer 418, enables the packet disassembler 414 to start extracting the multiframe number from the incoming data packet, and starts the CRC checker 416. After the packet has been received, the CRC checker 416 reports the status of the packet to the state machine 410. If the packet was received without error, then the state machine 410 starts the programmable delay timer 418. If the packet had an error, then the state machine 410 would transmit a Sync_Error signal 430 to the radio port control processor (not shown). When the programmable delay timer 418 expires, the state machine 410 loads the multiframe counter 428 of the reference time base 420 with the new multiframe number and sets the bit, slot and frame counters of the reference time base 420 to zero.

The combination of the multiframe sync generator 208, the broadcast of the Multiframe Synchronization Packet, and the multiframe sync detectors 402 can be used as a multiframe synchronization broadcast scheme. Again, no software modifications are required for this first embodiment of the PCS network controller 200 or the PCS radio port 400.

Figure 5:
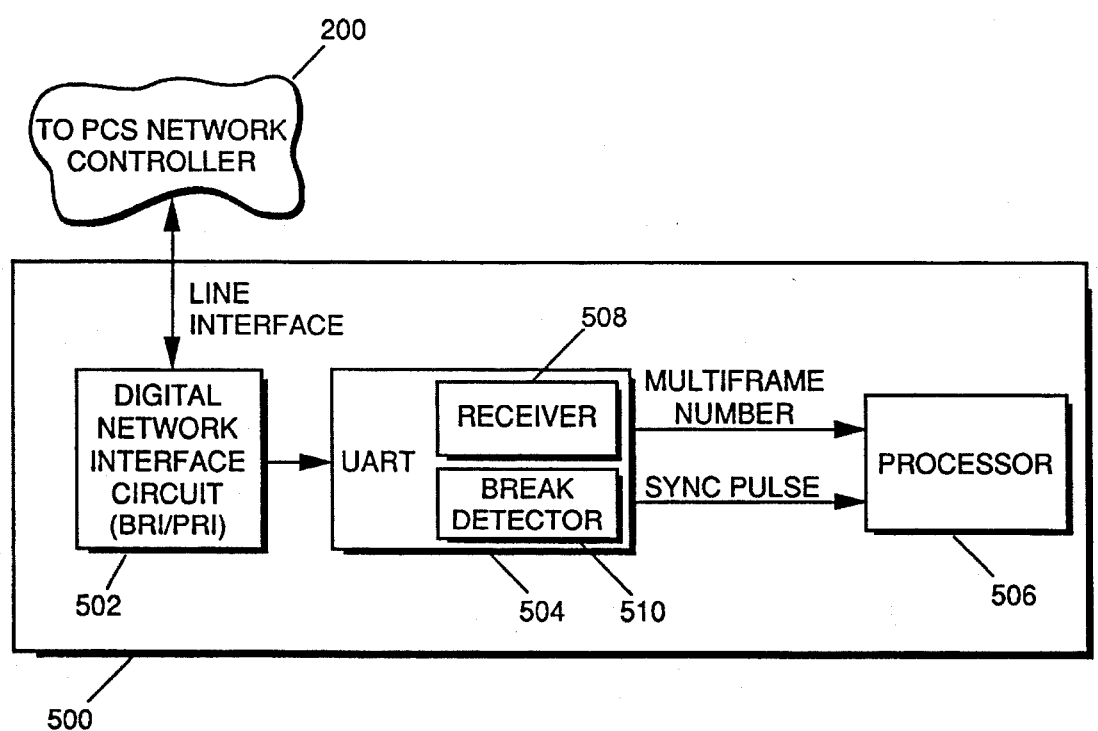
FIG. 5 is a block diagram of a second embodiment of a portion of a PCS radio port in accordance with the present invention.

In the case where custom hardware as described above is not desirable a second embodiment of the invention utilizes a universal asynchronous receiver/transmitter (UART) within the radio port. FIG. 5 shows this second embodiment wherein a radio port 500 receives the digital data including the multiframe number, sync word, and check byte as previously described in FIG. 2 through a digital network interface circuit 502 and then transfers the data to a receiver portion 508 of the UART 504. The UART 504 generates a synchronization (sync) pulse and transfers both the multiframe number and sync pulse to processor 506.

Figure 6:
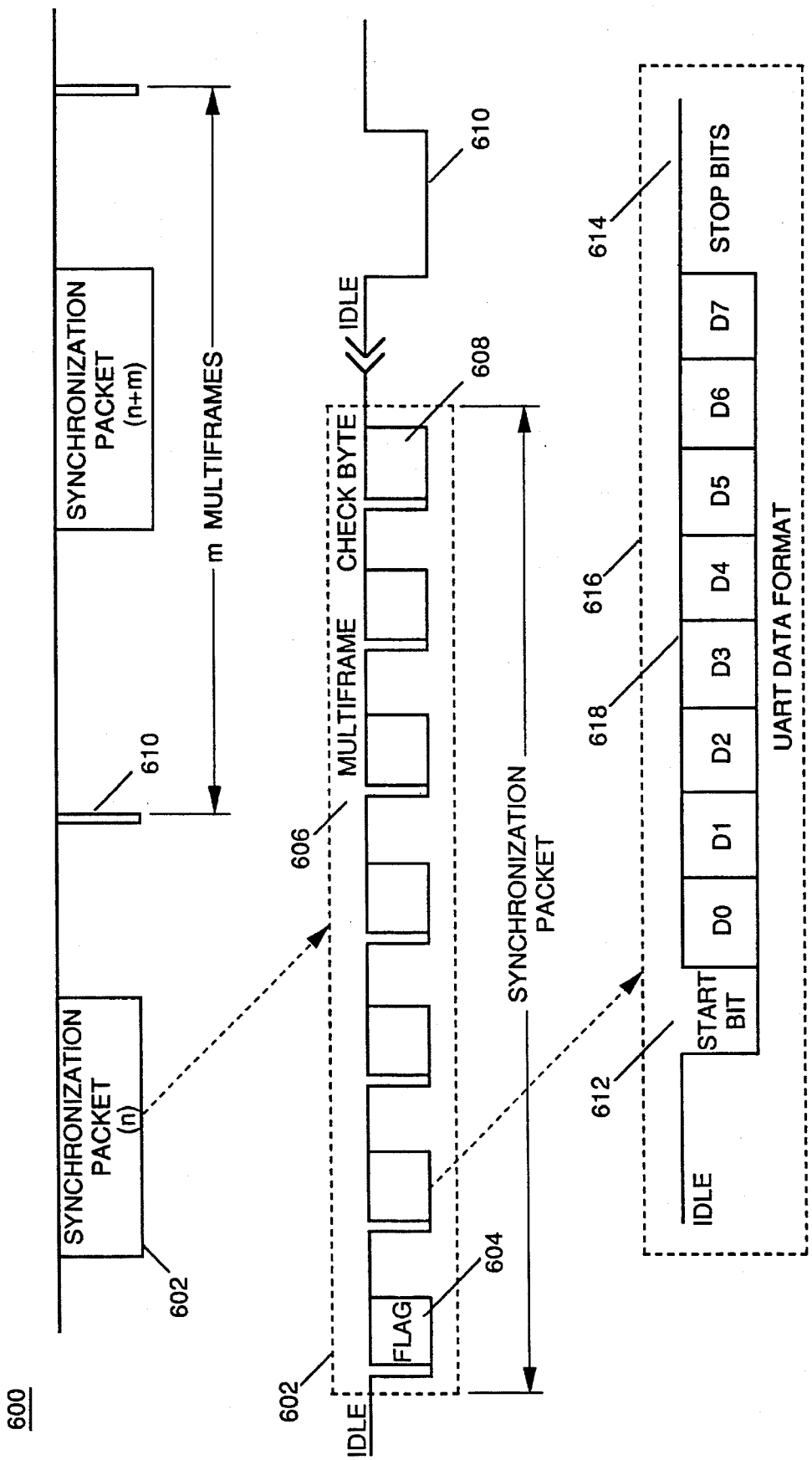
FIG. 6 is a timing diagram in accordance with the second embodiment of the invention.

The UART protocol is the de-facto standard for "asynchronous" communications. The term asynchronous is used because it is not necessary to send clocking information with the data that is sent. FIG. 6 illustrates the UART data frame format 600 generated by the network controller 200 in accordance with the present invention. Digital data 616 is transmitted using a UART protocol including a start bit 612, eight data bits 618, and a stop bit 614. When not active, the data stream remains high to simulate an idle condition. The UART receiver 508 over-samples the incoming data stream 600 and uses some of these samples to determine the bit value. The data stream 600 includes a break character 610 and synchronization packet 602 configured as flag 604, multiframe 606, and check byte 608. The synchronization packet 604 and break character 610 form a synchronization event. The flag 604 allows the processor 506 to distinguish the start of a message. The break character 610 is similar to the sync word of the previous embodiment and is used to synchronize the time reference in the radio port to that of the network controller. The break character 610 can be produced, for example, by forcing the C-Channel data low for ten consecutive bit periods. In the UART 504 this is detected by a Break Detector 510.

By controlling the clocking of the C-Channel of the digital network interface 502 to match that of a UART data format, communication between the digital network interface 502 and the UART 504 is possible. The UART 504 is thus indifferent to being driven by a synchronous input.

By using the C-Channel of a digital network interface to broadcast messages within a PCS system, multiframe synchronization between radio ports is achieved. The multiframe sync generator 208 and multiframe sync detector 402 as described by the invention provide a multiframe synchronization broadcasting scheme that allows the transmission of a synchronizing event and multiframe number through a single communication channel without software overhead.

While the preferred embodiment of the multiframe synchronization broadcasting scheme has been described using a signaling bit of the C-channel, either the B or D-channels could have been used as well. Communication systems requiring synchronous signaling channels, such as the DECT and WCPE systems, can use the broadcast circuitry as described by the invention. By applying the broadcasting scheme as described by the invention a simultaneous broadcast system is created which overcomes the aforementioned problems.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of synchronizing a radio port to a network controller within a communication system, comprising the steps of:

establishing a timing reference at the network controller;

generating a multiframe number based on the timing reference;

generating a check byte in response to the multiframe number;

transmitting the multiframe number and check byte over a predetermined channel to the radio port;

receiving the multiframe number and check byte at the radio port;

providing the multiframe number to a state machine within the radio port;

validating the check byte to determine if the received multiframe number is error free; and synchronizing the radio port to the network controller when the received multiframe number is error free.

2. A communication system, comprising:

a network controller for transmitting a multiframe synchronization event over a single communication channel;

a radio port for receiving the multiframe synchronization event, said radio port including means of determining if the multiframe synchronization event is error free; and said radio port synchronizing to the network controller when the multiframe synchronization event is error free.

3. A communication system as described in claim 2, wherein the communication system is a digital European cordless telephone (DECT) system.

4. A method of synchronizing a radio port to a network controller in a communication system, comprising the steps of:

at the network controller:

establishing a timing reference;

determining a multiframe number, check byte, and synchronization event based on the timing reference;

generating digital signaling information including the multiframe number, check byte, and synchronization event;

transferring the digital signaling information to the radio port using a single communication channel; and at the radio port:

receiving the digital signaling information;

determining if the digital signaling information is error free based on the check byte; and synchronizing to the network controller when the digital signaling information is error free.

5. A method as described in claim 4, wherein a cyclic redundancy check (CRC) calculation is done to determine if the signaling information is error free.

6. A method as described in claim 4, wherein the step of receiving includes the step of using a state machine to receive the digital signaling information transmitted by the network controller; and the step of synchronizing includes the step of controlling the synchronization of the radio port to the network controller using the state machine.

7. A method as described in claim 4, wherein the step of receiving includes the step of using a universal asynchronous receiver/transmitter to receive the digital signaling information transmitted by the network controller; and the step of synchronizing includes the step of controlling the synchronization of the radio port to the network controller using the universal asynchronous receiver/transmitter.

8. A method of providing synchronization between a radio port and a network controller, comprising the steps of:

providing a synchronization packet over a predetermined time frame, including:

providing a multiframe number within the synchronization packet;

performing a predetermined cyclic redundancy check calculation on the multiframe number;

generating a cyclic redundancy check result; and appending the multiframe number with the cyclic redundancy check result within the synchronization packet;

transmitting the synchronization packet over a predetermined communication channel;

detecting the synchronization packet at the radio port; and synchronizing the radio port to the network controller in response to the synchronization packet.

9. A method of providing synchronization between a radio port and a network controller as described in claim 8, wherein the step of synchronizing includes the steps of:

disassembling the detected synchronization packet;

performing a second cyclic redundancy check calculation on the multiframe number; and determining if the synchronization packet is error free based on the second cyclic redundancy check calculation.

10. A method of synchronizing a plurality of radio ports to a network controller in a communication system operating with a predetermined communication protocol, comprising the steps of:

generating a time reference related to the communication protocol;

generating a multiframe number based on the time reference;

performing a predetermined cyclic redundancy check calculation on the multiframe number to produce a check byte; and broadcasting the multiframe number and the check byte to the plurality of radio ports simultaneously.

11. A method of synchronizing a plurality of radio ports to a network controller as described in claim 10, wherein the step of broadcasting includes the step of using a single predetermined communication channel to broadcast the multiframe number from the network controller to the plurality of radio ports.

12. A method of synchronizing a plurality of radio ports to a network controller as described in claim 10, further comprising the steps of:

providing a chain of counters within the network controller;

sourcing the chain of counters with the time reference; and generating the multiframe number from the chain of counters in accordance with the predetermined communication protocol.

13. A method of synchronizing a plurality of radio ports to a network controller as described in claim 12, wherein the step of generating a multiframe number includes the steps of:

incrementing a pulse code modulated (PCM) frame count after a predetermined amount of time has elapsed based on the time reference;

comparing the PCM frame count to a predetermined PCM limit;

incrementing a second frame count when the PCM frame count reaches its predetermined PCM limit;

comparing the second frame count to a predetermined frame limit;

incrementing a multiframe count when the second frame count reaches its predetermined frame limit;

comparing the multiframe count to a predetermined multiframe limit; and initiating a multiframe event when the multiframe count reaches its predetermined multiframe limit.

14. A method of synchronizing a plurality of radio ports to a network controller as described in claim 13, wherein the step of initiating a multiframe event includes the steps of:

generating a synchronization word;

appending the result of the performed CRC calculation onto the multiframe number; and transmitting the synchronization word, the multiframe number, and the appended CRC result onto the single predetermined communication channel as a synchronization packet to the plurality of radio ports.

15. A method of synchronizing a plurality of radio ports to a network controller as described in claim 14, further comprising the steps of:

receiving the simultaneous broadcast at the radio ports;

disassembling the synchronization packet;

performing a predetermined CRC calculation on the synchronization packet;

validating the performed CRC calculation; and determining if the synchronization packet is error free based on the step of validating the performed CRC calculation.

16. A method of synchronizing a plurality of radio ports to a network controller as described in claim 15, further comprising the steps of:

detecting the synchronization word at the plurality of radio ports;

starting a delay timer in response to the synchronization word;

determining when the delay timer expires; and loading a multiframe counter with the multiframe number and resetting a series of bit, slot, and frame counters to zero when the delay timer expires and the synchronization packet is error free.

17. A communication system, comprising:

a network controller for transmitting a synchronization packet, said network controller including:
a reference timer;
a multiframe synchronization generator comprising:
a series of counters clocked by the reference timer and generating a multiframe number, said multiframe number being incremented in response to the series of counters;
a network controller state machine monitoring the series of counters and generating a synchronization word when the multiframe number is incremented;
a network controller cyclic redundancy checker for generating a check byte in response to the multiframe number;
said network controller state machine transmitting the synchronization word, multiframe number, and check byte as the synchronization packet; and a radio port for receiving the synchronization packet, said radio port including:
a multiframe synchronization detector including:
a packet disassembler for reformatting the synchronization packet;
a synchronization word detector for detecting the synchronization word;
a radio port cyclic redundancy checker generating a check byte based on the received synchronization packet, said check byte determining if the receive synchronization packet is error free;
a radio port state machine for monitoring the status of the radio port cyclic redundancy checker; and
a series of counters responsive to the radio port state machine, a portion of said counters being updated with the multiframe number when the synchronization packet is error free while the remainder of said series of counters are reset; and said network controller and said radio port being synchronized when the series of counters are updated with the multiframe number and the remainder of the series of counters are reset to zero.

18. A communication system as described in claim 17, wherein the radio port further comprises:

a programmable delay portion responsive to the radio port state machine and providing a predetermined delay time when the synchronization packet is error free, said series of counters being updated when the predetermined delay time has expired.

19. A communication system, comprising:

a network controller for transmitting a synchronization event including a synchronization packet and break character, said network controller including:
a reference timer;
a multiframe synchronization generator comprising:

a series of counters clocked by the reference timer and generating a multiframe number, said multiframe number being incremented in response to the series of counters;

a state machine monitoring the series of counters and generating the break character and a flag when the multiframe number is incremented;

a cyclic redundancy checker for generating a check byte in response to the multiframe number;

said state machine transmitting the flag, multiframe number, and check byte as the synchronization packet and also transmitting the break character; and a radio port for receiving the synchronization event, said radio port including a universal asynchronous receiver and transmitter (UART) for sampling the synchronization packet using a universal asynchronous receiver and transmitter protocol; and said universal asynchronous receiver and transmitter generating a synchronization pulse in response to the break character; and said state machine of the network controller providing signaling substantially similar to the universal asynchronous receiver and transmitter protocol.

* * * * *